(12) United States Patent
Keating et al.

(10) Patent No.: US 12,532,287 B2
(45) Date of Patent: Jan. 20, 2026

(54) UPDATING POSITIONING ASSISTANCE CONFIGURATION

(71) Applicant: NOKIA TECHNOLOGIES OY, Espoo (FI)

(72) Inventors: Ryan Keating, Chicago, IL (US); Johannes Harrebek, Aalborg (DK); Benny Vejlgaard, Gistrup (DK); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 360 days.

(21) Appl. No.: 18/028,641

(22) PCT Filed: Oct. 9, 2020

(86) PCT No.: PCT/CN2020/120054
§ 371 (c)(1),
(2) Date: Mar. 27, 2023

(87) PCT Pub. No.: WO2022/073215
PCT Pub. Date: Apr. 14, 2022

(65) Prior Publication Data
US 2023/0370993 A1   Nov. 16, 2023

(51) Int. Cl.
*H04W 64/00* (2009.01)
*H04W 74/0833* (2024.01)
*H04W 74/0836* (2024.01)

(52) U.S. Cl.
CPC ........ *H04W 64/00* (2013.01); *H04W 74/0833* (2013.01); *H04W 74/0836* (2024.01)

(58) Field of Classification Search
CPC ............. H04W 64/00; H04W 74/0833; H04W 74/0836; H04W 52/0216; H04W 52/0245; H04W 76/27; Y02D 30/70
See application file for complete search history.

(56) References Cited

U.S. PATENT DOCUMENTS 9,594,149 B2* 3/2017 Siomina ............. G01S 5/02524
2011/0039576 A1* 2/2011 Prakash ............... G01S 5/0236
455/456.1

(Continued)

FOREIGN PATENT DOCUMENTS

CN    101730223 A    6/2010
CN    109792584 A    5/2019

(Continued)

OTHER PUBLICATIONS

Notification of Second Office Action dated Oct. 8, 2024, corresponding to Chinese Patent Application No. 202080105861.X, with English translation thereof.

(Continued)

*Primary Examiner* — Ivan O Latorre
(74) *Attorney, Agent, or Firm* — SQUIRE PATTON BOGGS (US) LLP

(57) ABSTRACT

Embodiments of the present disclosure relate to updating positioning assistance configuration. A first device transmits a first request for updating a current positioning assistance configuration of the first device to a second device. The first device is in a radio resource control inactive mode, and the current positioning assistance configuration is used by the first device to receive a plurality of positioning reference signals from a plurality of positioning devices. Further, the first device receives a first response comprising a requested positioning assistance data for updating the current positioning assistance configuration from the second device. In this way, the first device can maintain being in a power saving mode meanwhile update the positioning assistance configuration in time.

18 Claims, 10 Drawing Sheets

(56) References Cited

U.S. PATENT DOCUMENTS

| | | | | |
|---|---|---|---|---|
| 2011/0201279 | A1* | 8/2011 | Suzuki | H04W 24/10 455/67.11 |
| 2012/0309404 | A1* | 12/2012 | Suzuki | H04W 56/0045 455/450 |
| 2012/0315890 | A1* | 12/2012 | Suzuki | H04W 24/10 455/422.1 |
| 2019/0182794 | A1* | 6/2019 | Wong | H04W 52/0216 |
| 2019/0230477 | A1* | 7/2019 | Yu | G01S 5/0236 |
| 2020/0229130 | A1* | 7/2020 | Keating | H04W 52/0229 |
| 2020/0264261 | A1 | 8/2020 | Akkarakaran et al. | |
| 2021/0185637 | A1* | 6/2021 | Agarwal | H04W 72/23 |
| 2021/0212124 | A1* | 7/2021 | Wakabayashi | G01S 19/25 |
| 2022/0110085 | A1* | 4/2022 | Khoryaev | H04L 5/0051 |
| 2022/0150866 | A1* | 5/2022 | Ren | H04B 7/0617 |
| 2022/0221548 | A1* | 7/2022 | Shreevastav | H04W 24/02 |
| 2022/0279425 | A1* | 9/2022 | Shreevastav | H04W 48/06 |
| 2022/0299589 | A1* | 9/2022 | Säily | G01S 5/0027 |
| 2023/0148057 | A1* | 5/2023 | Dong | G01S 5/0236 455/456.1 |
| 2023/0189198 | A1* | 6/2023 | Dong | H04W 68/005 455/456.1 |
| 2023/0370993 | A1* | 11/2023 | Keating | H04W 52/0216 |
| 2024/0196360 | A1* | 6/2024 | Kucera | H04W 64/00 |
| 2024/0323896 | A1* | 9/2024 | Manolakos | G01S 5/0236 |
| 2025/0047761 | A1* | 2/2025 | Michalopoulos | G06N 20/00 |
| 2025/0133577 | A1* | 4/2025 | Hu | H04W 64/00 |

FOREIGN PATENT DOCUMENTS

| | | |
|---|---|---|
| CN | 109842934 A | 6/2019 |
| CN | 110381526 A | 10/2019 |
| CN | 110858951 A | 3/2020 |
| CN | 110933715 A | 3/2020 |
| CN | 111278142 A | 6/2020 |
| CN | 111565470 A | 8/2020 |
| WO | 2019/121419 A1 | 6/2019 |
| WO | 2020/123817 A1 | 6/2020 |
| WO | 2020/146739 A1 | 7/2020 |
| WO | 2020/191646 A1 | 10/2020 |

OTHER PUBLICATIONS

First Office Action dated Apr. 19, 2024 corresponding to Chinese Patent Application No. 202080105861.X, with English translation thereof.

Extended European Search Report dated Jun. 6, 2024 corresponding to European Patent Application No. 20956530.8.

Nokia et al., "Dedicated positioning SIB delivery for on-demand SI in connected," 3GPP Draft; R2-1916107, 3GPP TSG-RAN WG2 Meeting #108, Reno, USA, Nov. 18-22, 2019, Nov. 8, 2019, XP051817656.

Intel Corporation, "WI summary for WI: NR positioning support," 3GPP Draft; RP-201987, 3GPP TSG RAN Meeting 4 #89e, Electronic Meeting, Sep. 14-18, 2020, Sep. 16, 2020, XP052341196.

International Search Report and Written Opinion dated Jun. 24, 2021 corresponding to International Patent Application No. PCT/CN2020/120054.

Intel Corporation, "Running CR for the introduction of NR positioning," 3GPP Draft; R2-2001934, 3GPP TSG-RAN WG2 Meeting #109 electronic, Elbonia, Mar. 6, 2020.

* cited by examiner

UPDATING POSITIONING ASSISTANCE CONFIGURATION

FIELD

Example embodiments of the present disclosure generally relate to the field of communication techniques and in particular, to devices, methods, apparatus and computer readable storage medium for updating positioning assistance configuration.

BACKGROUND

Wireless communications networks are widely deployed and can support various types of service applications for terminal devices. Meanwhile, the location of the terminal devices can be identified, such that a large number of commercial and non-commercial location-based services can be achieved. Therefore, the technology of wireless positioning is growing rapidly and has received a great deal of interest.

Typically, in a wireless positioning system, one or more positioning devices (such as, an access point (AP), a Node B (NodeB or NB), an Evolved NodeB (eNodeB or eNB), a NodeB in new radio access (gNB), and the like) may transmit positioning reference signals (PRSs) to a terminal device, and the terminal device may perform positioning measurement on the received PRSs. Then the terminal device may calculate the location of the terminal device itself or provide positioning measurement reports to a location server (such as, location management function (LMF)), such that the location can be derived from the measurement report. In such wireless positioning system, the terminal device needs to receive positioning assistance configuration from the location server. The positioning assistance configuration provides information for performing positioning measurement, and comprises parameters, such as, the positioning devices that transmit PRSs, the receiving window for receiving PRSs, and the like.

SUMMARY

In general, example embodiments of the present disclosure provide a solution for updating positioning assistance configuration. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to transmit, to a second device, a first request for updating a current positioning assistance configuration of the first device. The first device is in a RRC inactive mode, and the current positioning assistance configuration is used by the first device to receive a plurality of positioning reference signals from a plurality of positioning devices. The first device is further caused to receive, from the second device, a first response comprising a requested positioning assistance data for updating the current positioning assistance configuration.

In a second aspect, there is provided a second device. The second device comprises at least one processor; and at least one memory including computer program code; where the at least one memory and the computer program code are configured to receive, from a first device, a first request for updating the current positioning assistance configuration of the first device. The first device is in a RRC inactive mode and the current positioning assistance configuration is used by the first device to receive a plurality of positioning reference signals from a plurality of positioning devices. The second device is further caused to transmit, to the first device, a first response comprising a requested positioning assistance data for updating the current positioning assistance configuration.

In a third aspect, there is provided a third device. The third device comprises at least one processor; and at least one memory including computer program code; where the at least one memory and the computer program code are configured to receive, from a second device a second request for updating a current positioning assistance configuration of a first device. The first device is in a RRC inactive mode, and the current positioning assistance configuration is used by the first device to receive a plurality of positioning reference signals from a plurality of positioning devices. The third device is further caused to transmit, to the second device, a second response comprising the requested positioning assistance data of the current positioning assistance configuration.

In a fourth aspect, there is provided a method. The method comprises transmitting, at a first device and to a second device, a first request for updating a current positioning assistance configuration of the first device. The first device is in a RRC inactive mode, and the current positioning assistance configuration is used by the first device to receive a plurality of positioning reference signals from a plurality of positioning devices. The method further comprises receiving, from the second device, a first response comprising a requested positioning assistance data for updating the current positioning assistance configuration.

In a fifth aspect, there is provided a method. The method comprises receiving, at a second device from a first device, a first request for updating the current positioning assistance configuration of the first device. The first device is in a RRC inactive mode, and the current positioning assistance configuration is used by the first device to receive a plurality of positioning reference signals from a plurality of positioning devices. The method further comprises transmitting, to the first device, a first response comprising a requested positioning assistance data for updating the current positioning assistance configuration.

In a sixth aspect, there is provided a method. The method comprises receiving, at a third device and from a second device a second request for updating a current positioning assistance configuration of a first device. The first device is in a RRC inactive mode, and the current positioning assistance configuration is used by the first device to receive a plurality of positioning reference signals from a plurality of positioning devices. The method further comprises transmitting. The method further comprises transmitting, to the second device, a second response comprising the requested positioning assistance data of the current positioning assistance configuration.

In a seven aspect, there is provided a first apparatus. The first apparatus comprises means for means for transmitting, to a second device, a first request for updating a current positioning assistance configuration of the first apparatus. The first device is in a RRC inactive mode, and the current positioning assistance configuration is used by the first device to receive a plurality of positioning reference signals from a plurality of positioning devices. The first apparatus further comprises means for receiving, from the second apparatus, a first response comprising a requested positioning assistance data for updating the current positioning assistance configuration.

In an eighth aspect, there is provided a second apparatus. The second apparatus comprises means for means for receiving, from a first apparatus, a first request for updating the current positioning assistance configuration of the first apparatus. The first device is in a RRC inactive mode, and the current positioning assistance configuration is used by the first device to receive a plurality of positioning reference signals from a plurality of positioning devices. The second apparatus further comprises means for transmitting, to the first apparatus, a first response comprising a requested positioning assistance data for updating the current positioning assistance configuration.

In a ninth aspect, there is provided a third apparatus. The third apparatus comprises means for means for receiving from a second apparatus a second request for updating a current positioning assistance configuration of a first apparatus. The first device is in a RRC inactive mode, and the current positioning assistance configuration is used by the first device to receive a plurality of positioning reference signals from a plurality of positioning devices. The third apparatus further comprises means for transmitting, to the second apparatus, a second response comprising the requested positioning assistance data of the current positioning assistance configuration.

In a tenth aspect, there is provided a computer readable medium. The computer readable medium comprises program instructions for causing an apparatus to perform at least the method according to the fourth aspect.

In an eleventh aspect, there is provided a computer readable medium. The computer readable medium comprises program instructions for causing an apparatus to perform at least the method according to the fifth aspect.

In a twelfth aspect, there is provided a computer readable medium. The computer readable medium comprises program instructions for causing an apparatus to perform at least the method according to the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
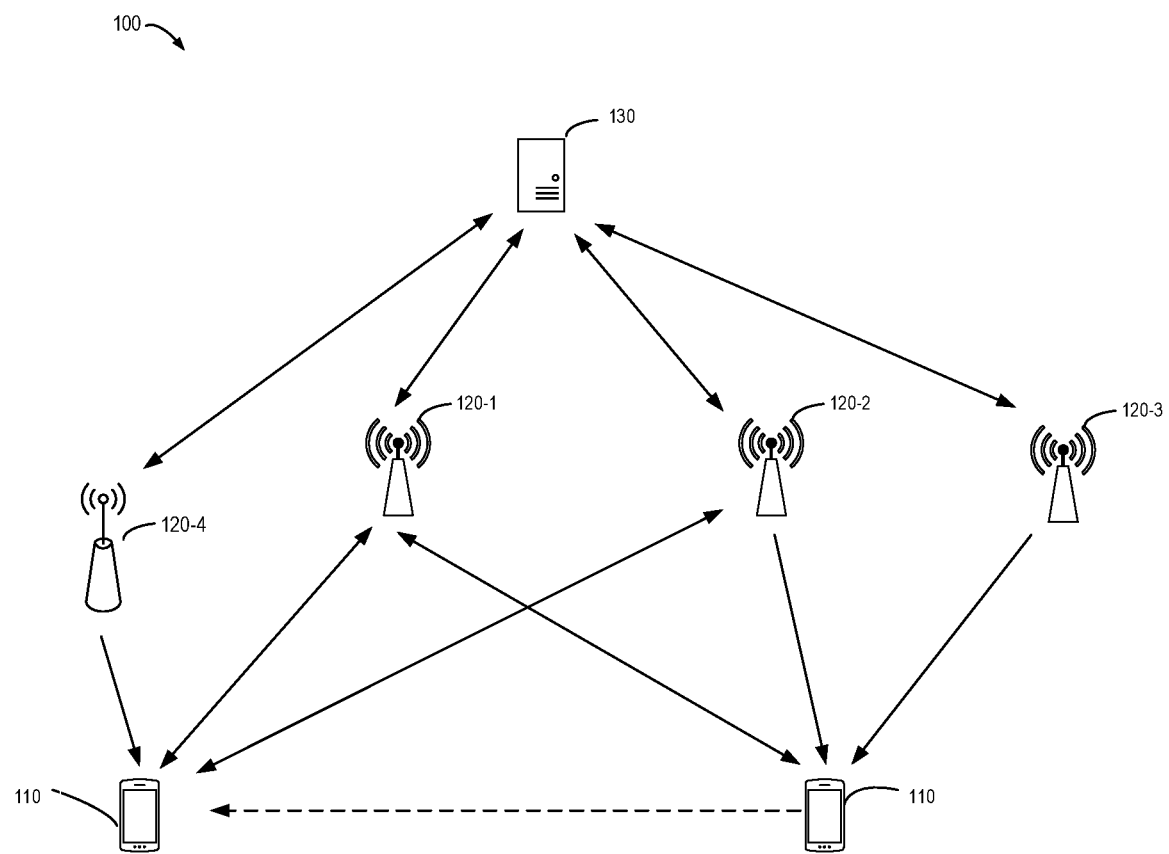
FIG. 1 illustrates an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular fourth device, or other computing or fourth device.

Communications discussed herein may use conform to any suitable standards including, but not limited to, New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a first device and a fourth device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "core device" refers to any device or entity that provides access and mobility management function, session management function (SMF), user plane function (UPF), etc. By way of example rather than limitation, the core device may be an AMF, a SMF, a UPF, etc. In other embodiments, the core device may be any other suitable device or entity.

As used herein, the term "network device" refers to a node in a communication network via which terminal devices accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground fourth device such as a satellite fourth device, a low earth orbit (LEO) satellite and a geosynchronous earth orbit (GEO) satellite, an aircraft fourth device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a tag with wireless communication capability, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "positioning device" refers to a node in a communication network which can transmit the reference signal (RS), i.e., PRS, to the terminal device. The term "positioning device" may include, but not limited to, a BS or an AP, a gateway, a registration management entity, and other suitable device in a communication system. The BS or the AP may refer to, for example, a NodeB or NB, an eNodeB or eNB, a gNB, a Remote Radio Unit (RRU), a radio header (RH), a remote radio head (RRH), a relay, a low power node such as a femto, a pico, and so forth, depending on the applied terminology and technology. Further, the terms "RS" and "PRS" refer to the signal that could be used for estimating the position or location for a device. In the present discourse, the terms "RS" and "PRS" can be exchanged with each other.

The term "location server" refers to any function, module, unit, device or entity that provides location services. More specifically, the location server may provide positioning assistance configuration to the terminal device, receive the report measurement reports from the terminal device and calculate the location of the terminal device, provide the location of the terminal device other network elements to enable commercial and non-commercial location-based services, configure the positioning device and so on. The location server can be an independent physical device or a virtual module, unit or function. In some example embodiments, the location server can be implemented in a core device or a network device.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discusses above, the technology of wireless positioning is growing rapidly and has received a great deal of interest. In release 16 of 3GPP, the following positioning solutions are specified for NR:

Downlink Time Difference of Arrival (DL-TDOA);
Uplink Time Difference of Arrival (UL-TDOA);
Downlink Angle of Departure (DL-AoD);
Uplink Angle of Arrival (UL-AoA); and
Multi-cell Round Trip Time (Multi-RTT).

In addition, in release 16, some solutions are proposed to enable radio access technology (RAT) dependent and RAT independent NR positioning solutions. For example, a new PRS are introduced for downlink (DL) measurement and new sounding reference signal (SRS) for positioning (SRS-P) for uplink (UL) measurement are introduced. A traditional solution for positioning solution is network-based DL-TDOA, where the terminal device measures reference signal (for example, PRS) time difference (RSTD) and reports the measurement result to the location server (such as, LMF) by the long term evolution (LTE) positioning protocol (LPP) and via its serving network device (such as, serving gNB). Further, in release 16, a concept of UE-based positioning has been proposed. In a UE-based positioning solution, the terminal device is configured with positioning assistance configuration (also referred to as assistance data), which enables that the terminal device locally estimates its location. The positioning assistance configuration provides information for performing positioning measurement. For example, the positioning assistance configuration may include the DL PRS configuration as well as the geographic location of the positioning devices.

In release 17, more technical solutions to support the requirements (such as, high accuracy (horizontal and vertical), low latency, network efficiency (scalability, RS overhead, etc.) and device efficiency (power consumption, complexity, etc.)) for commercial application (such as, IoT) have been proposed.

In order to enable a low power consumption, the terminal device may be in certain power saving mode (such as, dormancy mode, RRC inactive mode, RRC idle mode, and so on). Taking RRC inactive mode (which has been stipulated in the 3GPP standards, for example, TS 38.331) as an example, in case that the terminal device is in the RRC inactive mode, the terminal device can receive PRSs and paging message, but cannot perform any data traffic transmission/reception with the serving gNB on channels (such as, a physical uplink shared channel (PUSCH), a physical downlink shared channel (PDSCH) and any other channels that are available used for data transmission/reception). It can be seen that, the terminal device being in a RRC inactive mode only communicates some necessary interaction with the gNB.

The UE-based positioning in RRC inactive mode is possible, because the terminal device can measure DL signals (such as, PRSs) and obtain its location and meanwhile maintaining a lower power consumption. As discussed above, in the UE-based positioning solution, the terminal device needs to receive positioning assistance configuration from the location server via the network device. Further, in current wireless communication system, the terminal device may move at a high velocity and the wireless communication conditions may varies over time. For example, at time point T1, the terminal device can receive PRSs from positing devices A, B and C. At time point T2, the terminal device moves to another location, where the terminal may not receive PRSs from the positioning device A due to moving out of the coverage of positioning device A or the PRS from positioning device A being blocked, while the terminal device may receive PRS from a positioning device D. Therefore, the terminal device needs to update the positioning assistance configuration in time.

However, traditional solutions for updating positioning assistance configuration are only supported for UEs which are in the RRC connected state. For example, in 3GPP release 16, there are two solutions for the terminal device to receive positioning assistance configuration of DL PRSs: broadcast via network device and unicast over LPP signaling.

However, as for the solution of broadcast via network device, the positioning assistance configuration needs to be periodically broadcast all the time, which results a large amount of overhead. However, there may be many times where no terminal device needs to update positioning assistance configuration. Therefore, the solution of broadcast via network device introduces many unnecessary resources usage. Moreover, different terminal devices may require different positioning assistance configuration. Therefore, cell-specific positioning assistance configuration may not satisfy the requirement for a specific terminal device.

Further, as for the solution of unicast over LPP signaling, this solution can be applied to the terminal device in connected mode. Therefore, if a terminal device being in a RRC active mode needs to update its positioning assistance configuration, the terminal device has to switch to a connection mode first which results additional latency.

Therefore, it is now desirable to provide an efficient mechanism for updating positioning assistance configuration for a terminal device in power saving mode, especially for a terminal device in RRC active mode.

In order to address at least some of the above problems and other potential problems, according to example embodiments of the present disclosure, there is proposed a solution for updating positioning assistance configuration for a first device in a RRC inactive mode. In this solution, the first device in a RRC active mode transmits a first request for updating a current positioning assistance configuration of the first device to a second device (such as, a network device) and receives a requested positioning assistance data from the second device. The received requested positioning assistance data may be used for updating the current positioning assistance configuration of the first device. In summary, the present discourse provides a solution of updating positioning assistance configuration for the first device (such as, a terminal device) in the RRC inactive mode. In this way, the terminal device can maintain being in a power saving mode meanwhile enables to update the positioning assistance configuration in time.

In this discourse, embodiments are described with expression/term PRS. It should be appreciated that the term "PRS"

used herein is described only for the purpose of illustration without suggesting any limitations, and this present discourse can be applied to the solutions relating to any type of RS. That is, the terms "PRS" and "RS" used herein can be exchanged with each other.

FIG. 1 shows an example communication network 100 in which example embodiments of the present disclosure can be implemented. The network 100 includes a first device 110, second devices 120-1 to 120-4 (hereinafter collectively referred to as the second devices 120 or individually referred to as a second device 120) and a third device 130. As shown in FIG. 1, the first device 110 can communicate with one or more second device 120 via physical communication channels or links, and the second devices 120 can communicate with the third device 130 via physical communication channels or links. Further, the third device 130 may transmit information to the first device 110 via one or more second device(s) 120 according to the specific application scenarios.

In some example, the first device 110 is a terminal device, the second devices 120 are network devices, and the third device 130 is a core device or an application server functioning as a location server. In such example scenario, the first device 110 receives RSs (i.e., PRSs) from the second device 120. The third device 130 may provide positioning assistance configuration for the first device 110. Further, the first device 110 may be in an RRC inactive mode with respect to the second device 120 (such as, the second device 120-1) that is serving the first device 110. In addition, the second device 120 may be any type of network device. Only for the purpose of illustration without suggesting any limitations, the second devices 120-1 to 120-3 are gNBs and the second device 120-4 is WiFi AP.

Further, the first device 110 may move from one position to another location over time. As shown in FIG. 1, at time point T1, the first device 110 may receive PRSs from the second devices 120-1 to 120-3, while at time point T2, the first device 110 may receive PRSs from the second devices 120-1, 120-3 and 120-4.

It should be appreciated that although the third device 130 is shown as an independent device with respect to the second devices 120, in some other example embodiments, the third device 130 can be implemented in the second devices 120. In such case, the second devices 120 would function as a location server in addition to a network device.

It also should be appreciated that the numbers of first device, second device and third device are only for the purpose of illustration without suggesting any limitations. The communication environment 100 may include any suitable numbers of first device, second device and third device adapted for implementing embodiments of the present disclosure.

Figure 2:
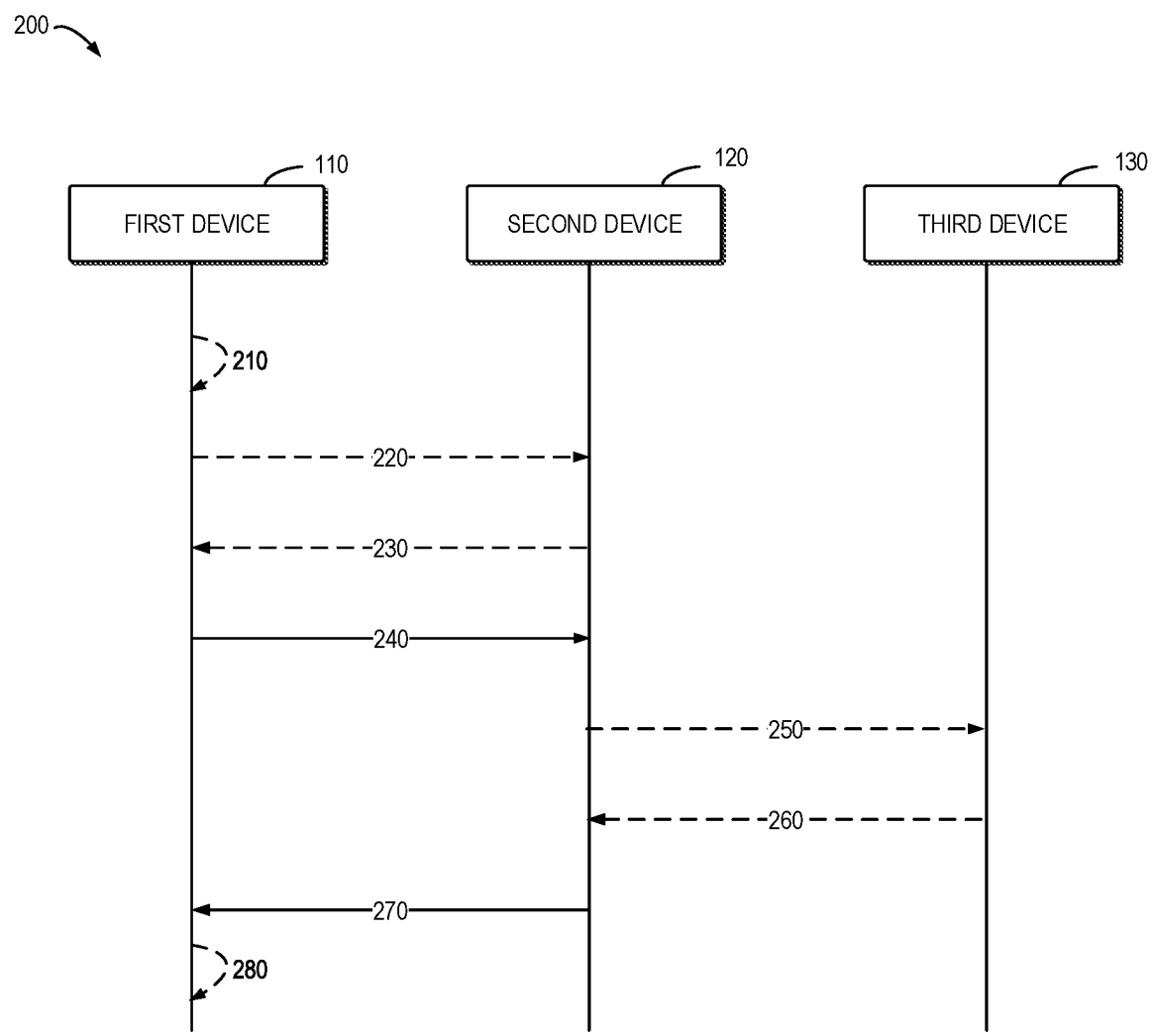
FIG. 2 illustrates an example signaling charts for the method of updating positioning assistance configuration between devices in accordance with some embodiments of the present disclosure.

Principle and implementations of the present disclosure will be described in detail below with reference to FIG. 2, which shows example signaling charts 200 for the method of updating positioning assistance configuration between devices in accordance with some embodiments of the present disclosure. The method may be implemented at any suitable devices according to the specific implements. Only for the purpose of illustrations, the signaling charts 200 are described to be implemented between the first device 110, the second device 120 and the third device 130 as shown in FIG. 1. Further, the first device 110 functions as a terminal device, the second device 120 functions as a network device and the third device 130 functions as a location server in a core device or an application server. Further, in this specific example embodiment, the first device 110 is in a RRC inactive mode and receives PRSs from one or more second devices 120.

Additionally, the first device 110 can locally maintain a current positioning assistance configuration. The positioning assistance configuration provides information for performing positioning measurement. For example, the positioning assistance configuration may include the DL PRS configuration, the geographic location of the positioning devices, the receiving window for receiving PRSs, and the like. In example embodiments, the first device 110 may maintain the positioning assistance configuration in form of a list comprising the information of the positioning devices. In some example embodiments, the current positioning assistance configuration is obtained from the third device 130 and used to receive a plurality of PRSs from a plurality of positioning devices (such as, a plurality of second device 120).

The first device 110 may determine 210 whether a condition is met first. In other words, the first device 110 may determine whether the first device 110 needs to update the current assistance positioning assistance configuration or not.

In some example embodiments, if the first device 110 determines that a signal strength value of at least one of the plurality of PRSs is below a threshold value, the first device 110 may determine that the conditions is met. The threshold value may be pre-configured parameter which represents the acceptable signal strength value for calculating/estimation the location of the first device 110.

As an example, the first device 110 receives PRSs from the second devices 120-1 to 120-3 first. Then, the first device 110 moves to another location and detects that the PRS from the second device 120-3 is below a threshold value. There are many events that may cause the PRSs from the second devices 120 being below a threshold value.

By way of example, the first device 110 moves to the edge of the coverage of the second device 120-3. As another example, the PRS from the second devices 120-3 has been blocked by some obstacles. One further example scenario is that the Quasi co-location (QCL) information is missing with respect to the PRS from the second devices 120-3. Yet another example scenario is that the expected reference signal time difference (RSTD) is out of date. It should be appreciated that the above examples are given for the purpose of illustration without suggesting any limitations, other events also may cause signal strength value of the plurality of PRSs being below the threshold value.

Alternatively, or in addition, if the first device 110 determines that the first device 110 cannot receive at least part of the PRSs from the second devices 120 according to the current assistance positioning assistance configuration, the first device 110 may determine that the conditions is met.

As an example embodiment, the first device 110 receives PRSs from the second devices 120-1 to 120-3 first. Then, the first device 110 moves to another location and detects that the first device 110 cannot receives the PRS from the second device 120-3. There are many events may cause the failure to receive at least one of the PRSs from the second device(s) 120.

One example scenario is that the first device 110 moves out of the coverage of the second device 120-3. Another example scenario is that the PRS from the second devices 120-3 has been blocked by some obstacles. One further example scenario is that the QCL information is missing with respect to the e the PRS from the second devices 120-3. Another further example scenario is that the RSTD is out of date. It should be appreciated that the above examples are given for the purpose of illustration without suggesting any limitations, other events also may cause that the first device 110 cannot receive the PRS(s) from the second device(s) 120.

Alternatively, or in addition, if the first device 110 detects a further positioning device that is not comprised in the current assistance positioning assistance configuration, the first device 110 may determine that the conditions is met.

As an example embodiment, the first device 110 receives PRSs from the second devices 120-1 to 120-3 first. Then, the first device 110 moves to another location and detects the second device 120-4, for example, detecting a PRS or pilot or other signals from the second device 120-4. There are many events may cause the first device 110 detects a further positioning device.

One example embodiment is that the first device 110 moves into the coverage of the second device 120-4. Another example embodiment is that the second device 120-4 may be hidden from the first device 110 previously. It should be appreciated that the above examples are given for the purpose of illustration without suggesting any limitations, other events also may cause that the first device 110 detects a further positioning device.

Alternatively, or in addition, the first device 110 may update the current positioning assistance configuration periodically. In such example embodiment, the first device 110 may maintains a timer and determines that the condition is met in response to a timeout of the timer.

It should be appreciated that the above conditions are given for the purpose of illustration without suggesting any limitations. The first device 110 may trigger the procedure for updating the current positioning assistance configuration bases on any suitable conditions. Further, the above conditions and the other suitable conditions may be used separately or in combination.

In this way, the first device 110 may monitor and trigger a procedure for updating positioning assistance configuration. Such that, once the current positioning assistance configuration is not suitable or can be improved, the first may trigger the procedure for updating positioning assistance configuration regardless of whether being in a RRC mode.

If the first device 110 determines the condition(s) is met, the first device 110 transmits 220 a first request for updating a current positioning assistance configuration. In this way, the first device 110 may inform its location server that the first device 110 needs to update its current positioning assistance configuration. It should be appreciated that the first device 110 may communicate with the location server directly or communicate with the location server via the second device 120 which enabling a communication with the location server. Regardless of whether the location server receives the first request from the first device 110 or the second device 120, the location server may understand that the terminal device 110 needs to update its current positioning assistance configuration. In this specific example embodiment, the first device 110 transmits the first request to the second device 120 to inform the location server that the terminal device 110 needs to update its current positioning assistance configuration.

In some example embodiments, the first request may comprise an indication that the at least one of the conditions is met. For example, the indication indicates that the signal strength value of at least one of the plurality of positioning reference signals is below the threshold value is met. For example, the first request comprises an indication that the PRS from the second device 120-3 is below the threshold value.

Alternatively, or in addition, the first request comprises an indication that the first device 110 cannot receive at least part of the PRSs according to the current positioning assistance configuration. For example, the first request comprises an indication that indicates a failure to receive at least one of the PRS from the second device 120-3.

Alternatively, or in addition, the first request comprises an indication that the first device 110 detects a further positioning device different from the plurality of positioning devices according the current positioning assistance configuration. For example, the first request comprises an indication that indicates the second device 120-4 is detected.

It should be appreciated that the requirement for updating current positioning assistance configuration could be represented in any form with any suitable parameter.

In some example embodiments, the first request may comprise a LPP message for updating positioning assistance configuration. The LPP message may be a general LPP message or also may be a new-defined LPP message (such as, AssistanceDataUpdateRequest).

In some example embodiments, wherein the first device is served by the second device (such as, the second device 120-4) and another second device (such as, the second device 120-1). Further, the first device 110 and is in the radio resource control inactive mode with respect to the another second device (such as, the second device 120-1). As the transmission between the first device 110 and the another second device (such as, the second device 120-1) is limited, the first device 110 may transmit the first request to the second device 120-4. In such example embodiment, the another second device may be a WiFi AP or Bluetooth (BT) and the first request may be an IP packet.

In this way, even the first device 110 in in a RRC active mode, the first device may also trigger the procedure for updating its positioning assistance configuration.

Alternatively, if the second device 120 (such as, the second device 120-1) is the serving network device and the first device 110 is in the RRC inactive mode with respect to the second device 120, the signaling interaction between the first device 110 and the second device 120 in limited. In such case, the first device 110 may update the current positioning assistance configuration via an improved random access (RA) procedure.

In some example embodiments, a 4-step RA may be used. During the 4-step RA procedure, four messages including RA Preamble/PRACH (i.e., Message 1 or Msg 1), RA response (i.e., Message 2 or Msg 2), Scheduled Transmission (i.e., Message 3 or Msg 3) and Contention Resolution message (i.e., Message 4 or Msg 4), may be exchanged between the terminal device 120 and the network device 110. Further, some data may be comprised in Message.

In the example embodiment of a 4-step RA, the first device 110 may use the Message 3 as the first request. As one example embodiment, the first device 110 send Message 3 comprising the LPP message, for example, via small data transmission (SDT).

In addition, in some example embodiments, the first device 110 transmits the message 1 of the 4-step RA with a pre-configured resource (such as, a pre-configured PRACH resource), where the pre-configured resource may indicate that the Message 3 of the 4-step RA procedure will be used as the first request for updating the current positioning assistance configuration.

In some example embodiments, the pre-configured resource is a pre-configured sequence (such as, preamble). In some other example embodiments, the pre-configured resource is a pre-configured frequency. Then, the second device 120-1 would be informed that the first device 110 needs to perform a procedure for updating the current positioning assistance configuration. Then, the second device 120-1 may transmit 230 a Message 2 of the 4-step random access procedure to the first device 110 and wait for the Message 3.

Alternatively, a 2-step RA also may be used. In a 2-step RA, the first device 110 and the second device 120 exchange two messages i.e., Message A and Message B. Further, the first device 110 may support early data transmission (EDT) during a 2-step RA, such that the first device 110 may transmit some data with the Message A. In the example embodiment of a 2-step RA, the first device 110 may use the Message A as the first request. More specifically, the first device 110 send message A comprising the LPP message, for example, via small data transmission (SDT). In addition, the Message A may be transmitted by the pre-configured resource, where the pre-configured resource may indicate that the Message A of the 2-step random access procedure is used as the first request for updating the current positioning assistance configuration. In some example embodiments, the pre-configured resource is a pre-configured sequence (such as, preamble). In some other example embodiments, the pre-configured resource is a pre-configured frequency. Then the second device 120 will be notified that Massage A is a request for updating the current positioning assistance configuration and then the second device 120 may parse the Message A.

It should be appreciated that the above pre-configured resources are given for the purpose of illustration without suggesting any limitations, and in the other example embodiments, other suitable resources may be used to indicates that Message 3 of the 4-step random access procedure or the Message A of the 2-step RA is used as the first request for updating the current positioning assistance configuration.

In this way, by improving the traditional RA procedure, the first device 110 may transmit the network device. It should be appreciated that this improved RA would not trigger an actually, traditional access procedure.

In some example embodiments, the second device 120 may comprise a module or unit that functions as a location server. Therefore, the second device 120 may generate the requested positioning assistance data itself.

Alternatively, the second device 120 may obtain the requested positioning assistance data from the third device 130 (such as, a core device or an application server that function as a location server). More specifically, the second device 120 transmits 250 a second request for updating the current positioning assistance configuration of the first device 110 according to the first request, and then receives 260 a second response comprising the requested positioning assistance data of the current positioning assistance configuration from the third device 130.

In some example embodiments, the second request is a LPP message for updating positioning assistance configuration, and the second response is a LPP message with a data container comprising the requested positioning assistance data accordingly.

In addition, in case that the first request comprises a LPP message for updating positioning assistance configuration and the second device 120 needs to obtain the requested positioning assistance data, the second device 120 extract the LPP message from the first request first, and transmit the extracted LPP message as the second request to the third device 130.

After obtaining the requested positioning assistance data, the second device 120 may transmit 270 a first response comprising a requested positioning assistance data for updating the current positioning assistance configuration.

In some example embodiments, if the first request comprises an indication that indicates that the signal strength value of at least one of the plurality of PRSs (for example, the PRS of the second device 120-3) is below the threshold value or the first device 110 cannot receive at least part of the PRSs (for example, the PRS of the second device 120-3) according to the current positioning assistance configuration, the first response may comprise a requested positioning an assistance data of the specific positioning device (for example, the second device 120-3).

In some example embodiments, if the first request comprises indication that the first device 110 detects a further positioning device (for example, the second device 120-4) different from the plurality of positioning devices according the current positioning assistance configuration, the first response may comprise a positioning assistance configuration of the specific positioning device (for example, the second device 120-4). Alternatively, the first request may comprise a complete positioning an assistance configuration for the first device 110.

In some example embodiments, if the first request at 240 is a Message 3 of a 4-step random access procedure, the first response at 270 is a Message 4 of the 4-step random access procedure accordingly.

In addition, in case to a 4-step RA procedure, if the second device 120 needs to obtains the further positioning an assistance configuration from the third device 130, the second device 120 has to wait to send message 4 until it receives LPP container from the third device 130, which results that the first device 110 also has to wait the reply to the Message 1. In current specification the UE is configured with ra-ContentionResolutionTimer which sets the time the UE will wait for Message 4 before considering the RA attempt failed. Currently this value in NR can be set in a range of value from 8-64 subframes. Depending on the deployment and the delays between the third device 130 (such as, a location server) and the second device 120 (such as, a gNB), this value should be selected appropriately to allow the LMF time to respond to gNB. Generally speaking, the duration for a message transmitted between gNB/LMF is expected to take ~4 ms. In the case that a cell has a short ra-ContentionResolutionTimer and does not wish to change this for positioning purposes, the Message 4 may comprise a pointer to indicate configured DL resources, from which the first device 110 can then receive the LPP message AssistanceDataUpdate. In this way, the first device 110 may complete the RACH process within the ra-ContentionResolutionTimer.

Alternatively, the first device 110 performing a above 4-step RA procedure for updating current positioning assistance configuration may also be specified to use a longer ra-ContentionResolutionTimer than the cell specific configuration (for example, ra-ContentionResolutionTimer=sf64).

Alternatively, if the first request at 240 is a Message A of a 2-step random access procedure, the first response at 270 is a Message B of the 2-step random access procedure accordingly. Alternatively, if the first request at 240 is an IP packet, the first response at 270 is an IP packet accordingly.

In some example embodiments, the first device 110 updates 280 the current positioning assistance configuration with the received requested positioning assistance data.

In some example embodiments, the first device 110 deletes the invalided/outdated/unnecessary positioning assistance configuration if too many positioning devices/gNBs/resources are maintained in memory. Further, the first device 110 continues to be in RRC inactive mode. Then, the first device 110 may perform DL positioning in UE-based and a RRC inactive mode.

In this way, the terminal device can maintain being in a power saving mode meanwhile enables to update the positioning assistance configuration in time.

Figure 3:
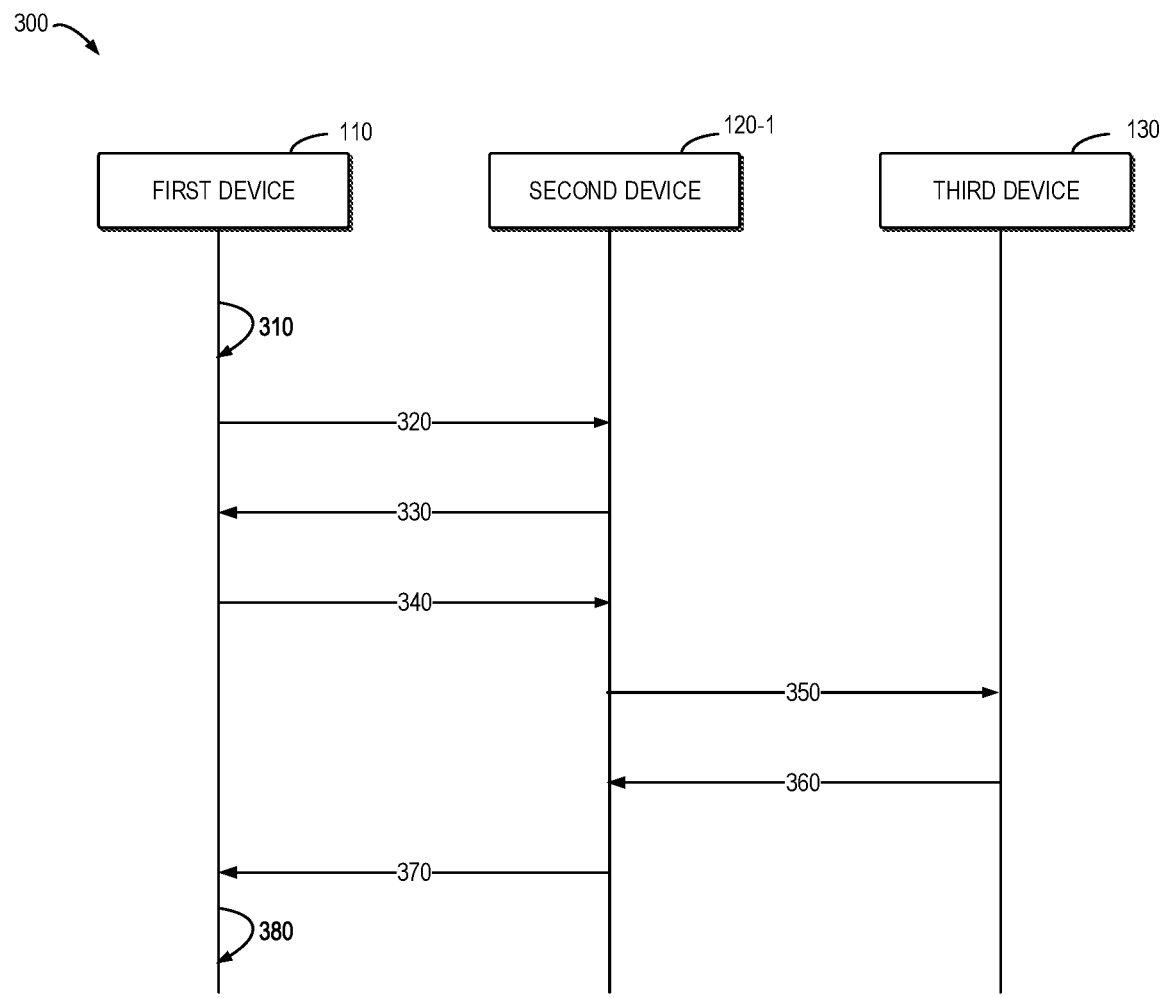
FIG. 3 illustrates another example signaling charts for the method of updating positioning assistance configuration between devices in accordance with some embodiments of the present disclosure.
Figure 4:
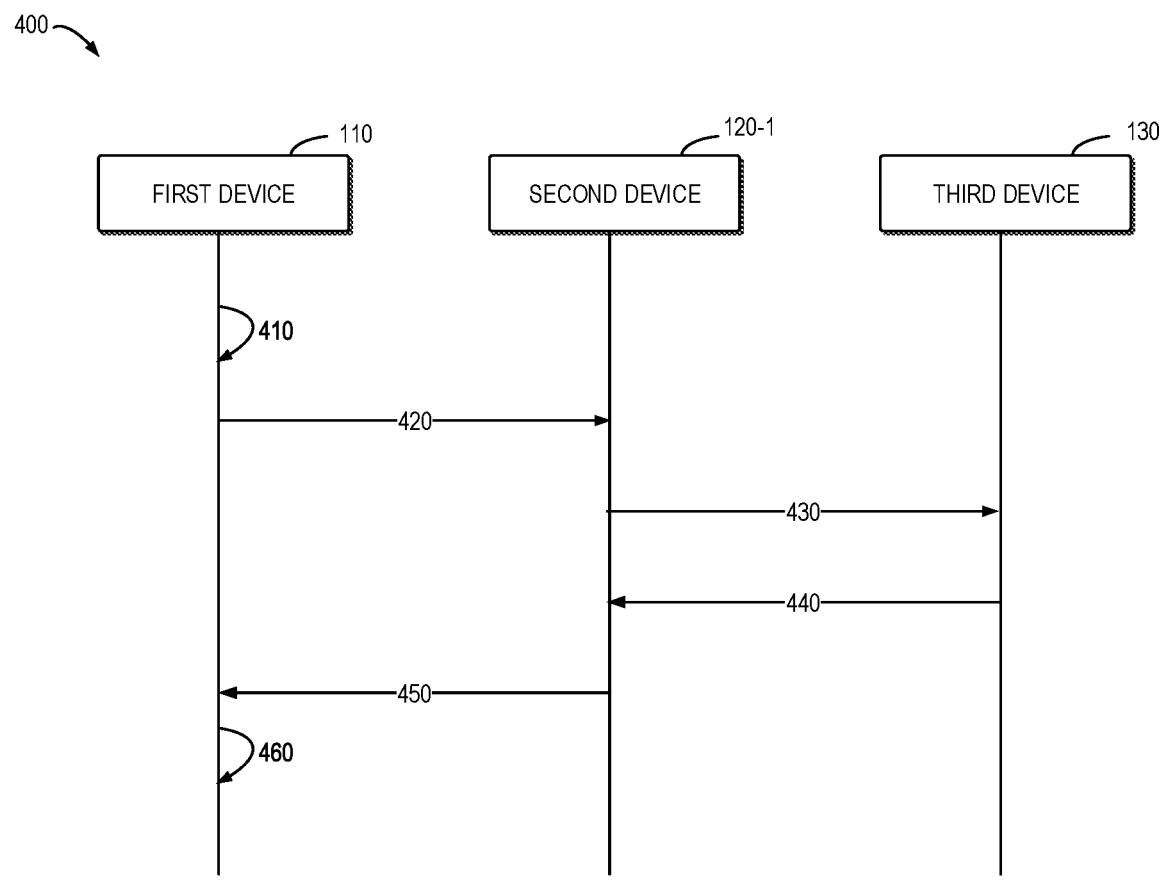
FIG. 4 illustrates another example signaling charts for the method of updating positioning assistance configuration between devices in accordance with some embodiments of the present disclosure.
Figure 5:
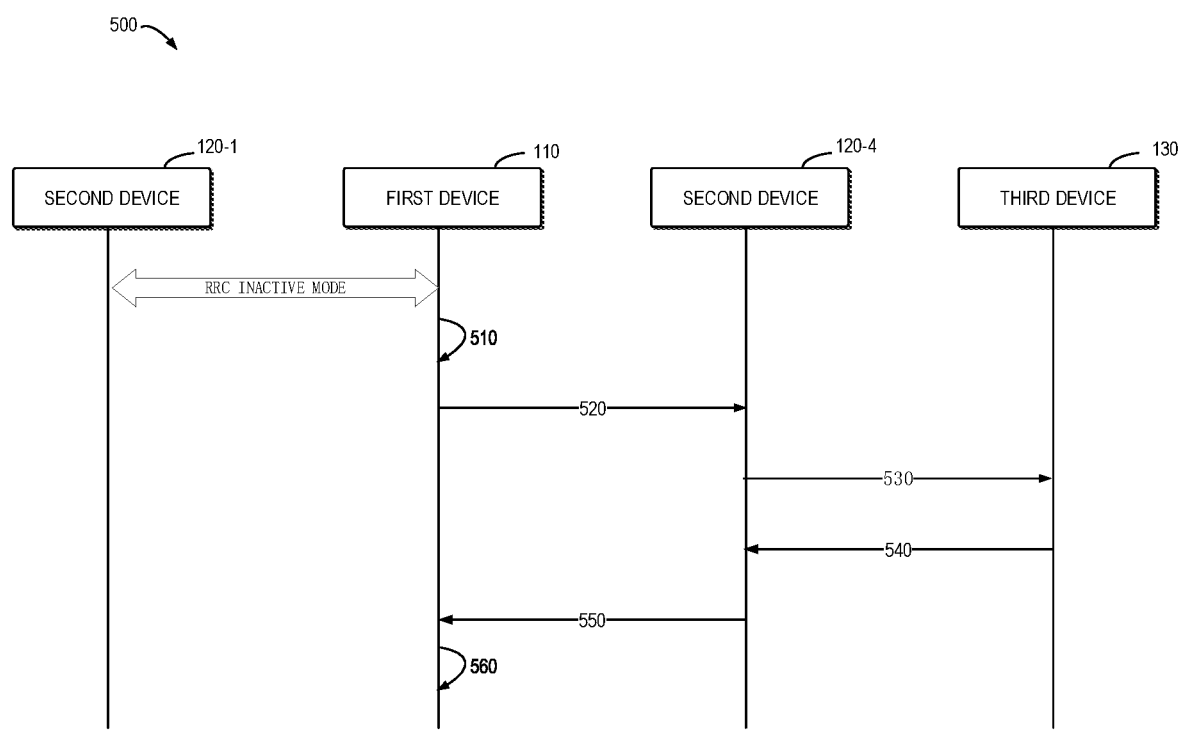
FIG. 5 illustrates another example signaling charts for the method of updating positioning assistance configuration between devices in accordance with some embodiments of the present disclosure.

FIGS. 3-5 illustrate three example signaling charts for the method of updating positioning assistance configuration between devices for different scenarios, which is illustrated for better understanding of the present disclosure. It should be appreciated that the signaling charts of FIGS. 3-5 are given for the purpose of illustration without suggesting any limitations.

Example for Updating Current Assistance Configuration Through a 4-Step RA

FIG. 3 shows example signaling charts 300 for the method of updating positioning assistance configuration between devices through a 4-step RA. Only for the purpose of illustrations, the signaling charts 300 are described to be implemented between the first device 110, the second device 120-1 and the third device 130 as shown in FIG. 1. Further, the first device 110 functions as a terminal device, the second device 120-1 functions as a serving network device and the third device 130 functions as a location server in a core device or an application server. Further, in this specific example embodiment, the first device 110 is in a RRC inactive mode with respect to the second device 120-1 and receives PRSs from one or more second devices 120.

The first device 110 determines 310 whether a condition is met first. The condition can be any suitable condition as discussed in the example embodiment of FIG. 2. For example, the first device 110 receives a PRS or pilot or other signals from the second device 120-4. If the first device 110 determines that the condition is met, the first device 110 transmits 320 a Message 1 of a 4-step RA (i.e., Physical Random Access Channel (PRACH)) to the second device 120-1. Further, the Message 1 is transmitted with a pre-configured PRACH resource (e.g., sequence).

When receive the Message 1 from the first device 110, as the Message 1 is transmitted with the pre-configured PRACH resource, the second device 120-1 will know that the RA initiated by the first device 110 is not a traditional RA. The second device 120-1 will transmits 330 a Message 2 of the 4-step RA to the first device 110 and wait for the Message 3 of the 4-step RA.

The first device 110 transmits 340 Message 3 of the 4-step RA to the second device 120-1. Further, the Message 3 comprises a LPP message for updating positioning assistance configuration. The LPP message is transmitted as SDT of Message 3 of the 4-step RA. Further, the LPP message may indicate that the first device 110 can receive signals from the second device 120-4 and would like to obtain the DL PRS configuration for the second device 120-4.

The second device 120-1 will extracted the LPP message for updating positioning assistance configuration from the Message 3 of the 4-step RA and forwards 350 the extracted LPP message to the third device 130. In this specific embodiment, the LPP message is transparent at the second device 120-1. The second device 120-1 only knows that it is LPP message without decoding the LPP message.

The third device 130 receives the extracted LPP message and generates the positioning assistance configuration of the second device 120-4. Then the third device 130 transmits 360 a LPP response with a data container comprising the positioning assistance configuration of the second device 120-4.

Then, the second device 120-1 transmits 370 Message 4 to the first device 110. The Message 4 comprises the positioning assistance configuration of the second device 120-4.

The first device 110 updates 380 its current positioning assistance configuration with the received positioning assistance configuration of the second device 120-4. Then, the first device 110 may receive PRS from the second device 120-4 and continues to perform UE-based positioning. After this procedure, the first device 110 continues to stay in inactive mode with respect to the second device 120-1.

Example for Updating Current Assistance Configuration Through a 2-Step RA

FIG. 4 shows example signaling charts 400 for the method of updating positioning assistance configuration between devices through a 2-step RA. Only for the purpose of illustrations, the signaling charts 300 are described to be implemented between the first device 110, the second device 120-1 and the third device 130 as shown in FIG. 1. Further, the first device 110 functions as a terminal device, the second device 120-1 functions as a serving network device and the third device 130 functions as a location server in a core device or an application server. Further, in this specific example embodiment, the first device 110 is in a RRC inactive mode with respect to the second device 120-1 and receives PRSs from one or more second devices 120.

The first device 110 determines 410 whether a condition is met first. The condition can be any suitable condition as discussed in the example embodiment of FIG. 2. For example, the first device 110 receives a PRS or pilot or other signals from the second device 120-4. If the first device 110 determines that the condition is met, the first device 110 transmits 420 a Message A of a 2-step RA to the second device 120-1. Further, the Message A is transmitted with a pre-configured PRACH resource (e.g., sequence).

When receive the Message A from the first device 110, because the Message A is transmitted with the pre-configured PRACH resource, the second device 120-1 will know that RA initiated by the first device 110 is not a traditional RA.

Further, the Message A comprises a LPP message for updating positioning assistance configuration. The LPP message is transmitted as SDT of Message A. Further, the LPP message may indicate that the first device 110 can receive signals from the second device 120-4 and would like to obtain the DL PRS configuration for the second device 120-4.

The second device 120-1 will extracted the LPP message for updating positioning assistance configuration from the Message A and forwards 430 the extracted LPP message to the third device 130. In this specific embodiment, the LPP message is transparent at the second device 120-1. The second device 120-1 only knows that it is LPP message without obtain decoding the LPP message.

The third device 130 receives the extracted LPP message and generates the positioning assistance configuration of the second device 120-4. Then the third device 130 transmits 440 a LPP response with a data container comprising the positioning assistance configuration of the second device 120-4.

Then, the second device 120-1 transmits 450 Message B to the first device 110. The Message B comprising the positioning assistance configuration of the second device 120-4.

The first device 110 updates 460 its current positioning assistance configuration with the received positioning assistance configuration of the second device 120-4. Then, the first device 110 may receive PRS from the second device 120-4 and continues to perform UE-based positioning. After this procedure, the first device 110 continues to stay in inactive mode with respect to the second device 120-1.

Example for Updating Current Assistance Configuration Via a WiFi AP

FIG. 5 shows example signaling charts 500 for the method of updating positioning assistance configuration between devices via a WiFi AP. Only for the purpose of illustrations, the signaling charts 300 are described to be implemented between the first device 110, the second device 120-1, the second device 120-4 and the third device 130 as shown in FIG. 1. Further, the first device 110 functions as a terminal device, the second device 120-1 functions as a serving network device, the second device 120-4 functions as a WiFi AP serving the first device 110 and the third device 130 functions as a location server in a core device or an application server. Further, in this specific example embodiment, the first device 110 is serving by the second device 120-1, the second device 120-4. In addition, the first device 110 is in a RRC inactive mode with respect to the second device 120-1 and receives PRSs from one or more second devices 120.

The first device 110 determines 510 whether a condition is met first. The condition can be any suitable condition as discussed in the example embodiment of FIG. 2. For example, the first device 110 receives PRSs from the second devices 120-1 to 120-3 first. Then, the first device 110 moves to another location and detects that the PRS from the second device 120-3 is below threshold value due to a QCL missing. Further, the IP message may indicate that the PRS signal from the second device 120-3 is below threshold value.

If the first device 110 determines that the condition is met, the first device 110 transmits 510 an IP Message for updating the current positioning assistance configuration to the second device 120-4. Further, before transmitting the IP message, a UE/LAN proximity procedure can be performed between the second device 120-4 and the first device 110. Similar with the Message 3 of a 4-step RA and Message A of a 2-step RA, the IP message may comprise a LPP message for updating positioning assistance configuration.

The second device 120-4 will generate a request for updating positioning assistance configuration. As one example, the second device 120-4 generates request for updating positioning assistance configuration by extracting a LPP message for updating positioning assistance configuration from the IP Message received at 520. Then, the second device 120-4 transmits 530 the request to the third device 130.

The third device 130 receives the request form the second device 120-4 and generated an updated positioning assistance configuration of the second device 120-3. Then the third device 130 transmits 540 a response with the updated positioning assistance configuration of the second device 120-3 to the second device 120-4. As an example, the request and response exchanged between the second device 120-4 and the third device 130 are LPP request and LPP response.

Then, the second device 120-4 transmits 550 a response (for example, an IP packet) comprising the configuration of the second device 120-3 to the first device 110. The response comprising the updated positioning assistance configuration of the second device 120-3.

The first device 110 updates 560 its current positioning assistance configuration with the received positioning assistance configuration of the second device 120-3. Then, the first device 110 may update the positioning assistance configuration and then may receive PRS from the second device 120-3. Therefore, the first device 110 can updating its current positioning assistance configuration without switch into an RRC active mode and further does not need to perform a RA procedure.

Figure 6:
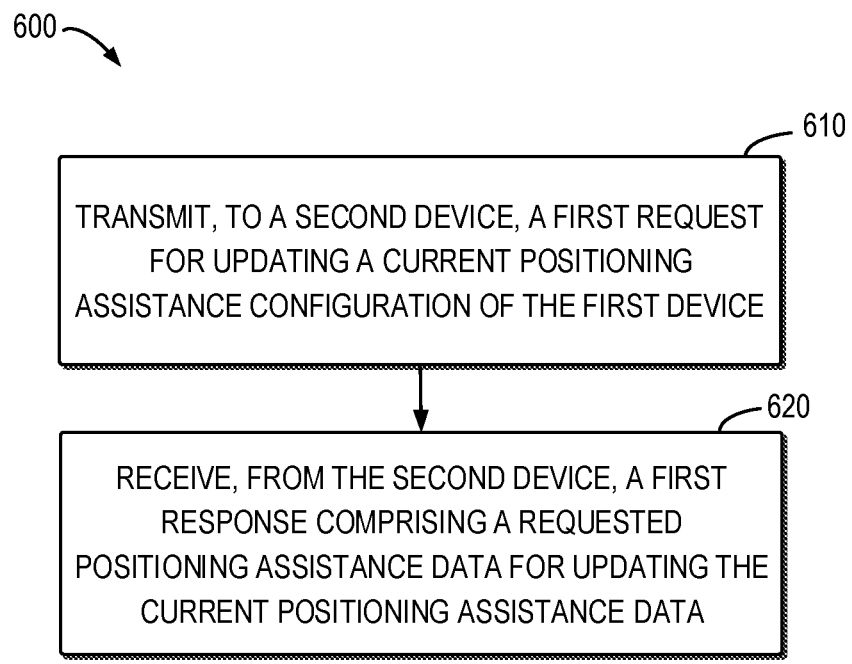
FIG. 6 illustrates an example flowchart of a method implemented at a first device according to some example embodiments of the present disclosure.

FIG. 6 shows a flowchart of an example method 600 implemented at a first device 110 in accordance with some example embodiments of the present disclosure. For the purpose of discussion, the method 600 will be described from the perspective of the first device 110 with respect to FIG. 1. It is to be understood that the method 600 may include additional blocks not shown and/or may omit some shown blocks, and the scope of the present disclosure is not limited in this regard.

At block 610, the first device 110 transmits, at a first device 110 and to a second device 120, a first request for updating a current positioning assistance configuration of the first device 110. The first device 110 is in a RRC inactive mode, and the current positioning assistance configuration is used by the first device 110 to receive a plurality of positioning reference signals from a plurality of positioning devices.

At block 620, the first device 110 receives from the second device 120, a first response comprising a requested positioning assistance data for updating the current positioning assistance configuration.

In some example embodiments, the first device 110 to transmit the first request comprises: determining whether at least one of the following conditions is met: a signal strength value of at least one of the plurality of positioning reference signals is below a threshold value, failure to receive at least one of the plurality of positioning reference signals and detection of a further positioning device different from the plurality of positioning devices according to the current positioning assistance configuration of the first device 110. In accordance with a determination that at least one of the conditions is met, the first device 110 transmits the first request to the second device 120.

In some example embodiments, the first request comprises an indication that the at least one of the conditions is met.

In some example embodiments, the first request comprises a LPP message for updating positioning assistance configuration.

In some example embodiments, the first device 110 is served by the second device 120 and is in the RRC inactive mode with respect to the second device 120 and the first request is a Message 3 of a 4-step random access procedure and the first response is a Message 4 of the 4-step random access procedure.

In some example embodiments, the first device 110 transmits, to the second device 120, a Message 1 of the 4-step random access procedure transmitted with a pre-configured resource. The pre-configured resource indicates that the Message 3 of the 4-step random access procedure will be used as the first request for updating the current positioning assistance configuration; receiving, from the second device 120, a Message 2 of the 4-step random access procedure. The first device 110 transmits, to the second device 120, the Message 3 of the 4-step random-access procedure to update the current positioning assistance configuration of the first device 110.

In some example embodiments, the first device 110 transmits to the second device, a Message A of the 2-step random access procedure transmitted with a pre-configured resource, the pre-configured resource indicating that the Message A of the 2-step random access procedure is used as the first request for updating the current positioning assistance configuration.

In some example embodiments, the pre-configured resource comprises at least one of the following: a pre-configured preamble and a pre-configured frequency.

In some example embodiments, the first device 110 is served by the second device 120 and is in the RRC inactive mode with respect to the second device 120 and the first request is a Message A of a 2-step random access procedure and the first response is a Message B of the 2-step random access procedure.

In some example embodiments, the first device 110 is served by the second device 120 and a fourth device, and is in the RRC inactive mode with respect to the fourth device.

In some example embodiments, the first device 110 updates the current positioning assistance configuration with the received requested positioning assistance data.

In some example embodiments, the first device 110 is a terminal device and the second device 120 is a network device or a location server.

Figure 7:
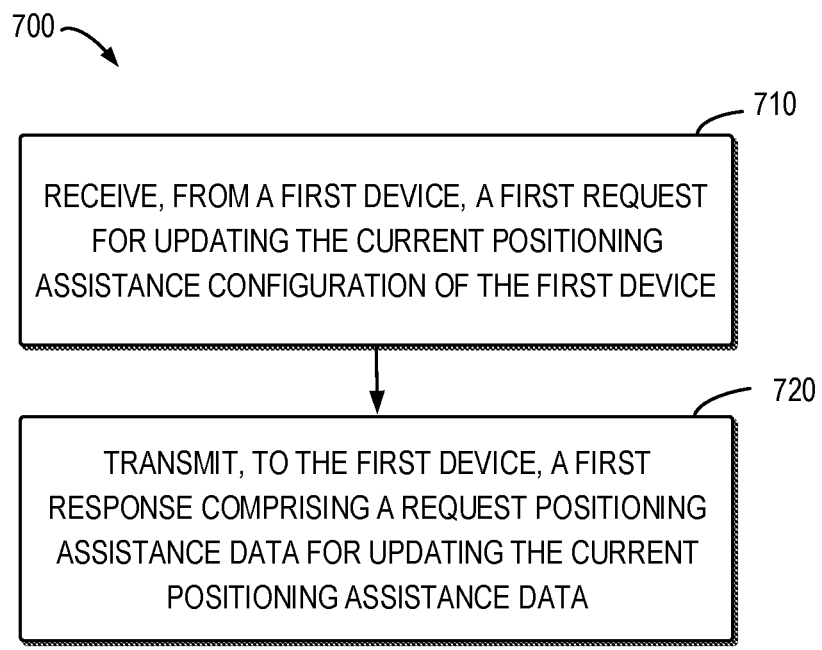
FIG. 7 illustrates an example flowchart of a method implemented at a second device according to some example embodiments of the present disclosure.

FIG. 7 shows a flowchart of an example method 700 implemented at a second device 120 in accordance with some example embodiments of the present disclosure. For the purpose of discussion, the method 700 will be described from the perspective of the second device 120 with respect to FIG. 1. It is to be understood that the method 700 may include additional blocks not shown and/or may omit some shown blocks, and the scope of the present disclosure is not limited in this regard.

At block 710, the second device 120 receives from a first device 110, a first request for updating the current positioning assistance configuration of the first device 110. The first device 110 is in a RRC inactive mode and the current positioning assistance configuration is used by the first device 110 to receive a plurality of positioning reference signals from a plurality of positioning devices.

At block 720, the second device 120 transmits, to the first device 110, a first response comprising a requested positioning assistance data for updating the current positioning assistance configuration.

In some example embodiments, the first request comprises an indication that the at least one of followings conditions is met: a signal strength value of at least one of the plurality of positioning reference signals is below a threshold value; failure to receive at least one of the plurality of positioning reference signals; missing of a Quasi co-location information; outdating of an expected RSTD reference signal time difference; and detection of a further positioning device different from the plurality of positioning devices according to the current positioning assistance configuration of the first positioning device 110.

In some example embodiments, the first request comprises with is a LPP message for updating positioning assistance configuration.

In some example embodiments, the first device 110 is served by the second device 120 and is in the RRC inactive mode with respect to the second device 120; and wherein the first request is a Message 3 of a 4-step random access procedure and the first response is a Message 4 of the 4-step random access procedure.

In some example embodiments, the second device 120 receives, from the first device 110, a Message 1 of the 4-step random access procedure transmitted with a pre-configured resource. The pre-configured resource indicates that the Message 3 of the 4-step random access procedure will be used as the first request for updating the positioning assistance configuration. Further, the second device 120 transmits, to the first device 110, a Message 2 of the 4-step random access procedure from the second device 120. In addition, the second device 120 receives, from the first device 110, the Message 3 of the 4-step random-access procedure for updating the current positioning assistance configuration of the first device 110.

In some example embodiments the first device 110 is served by the second device 120 and is in the RRC inactive mode with respect to the second device 120 and the first request is a Message A of a 2-step random access procedure and the first response is a Message B of the 2-step random access procedure.

In some example embodiments, the second device 120 receives from the first device, a Message A of the 2-step random access procedure transmitted with a pre-configured resource. The pre-configured resource indicates that the Message A of the 2-step random access procedure is used as the first request for updating the current positioning assistance configuration.

In some example embodiments, the pre-configured resource comprises at least one of the following: a pre-configured preamble; and a pre-configured frequency.

In some example embodiments, the first device 110 is served by the second device 120 and a fourth device, and is in the RRC inactive mode with respect to the fourth device.

In some example embodiments, the second device 120 transmits, to a third device 130 a second request for updating the current positioning assistance configuration of the first device 110 according to the first request. Further, upon receiving a second response comprising the requested positioning assistance data from the third device 130, the second device transmits, to the first device 110, a first response based on the received second response.

In some example embodiments, the second request is a LPP message for updating positioning assistance configuration, and the second response is a LPP message with a data container comprising the requested positioning assistance data.

In some example embodiments, the first request comprises a LPP message for updating positioning assistance configuration, and the second device 120 to transmit the second request comprises: extracting the LPP message from the first request; and transmitting the extracted LPP message as the second request to the third device 130.

In some example embodiments the first device 110 is a terminal device, and the second device 120 is a network device or a location server.

Figure 8:
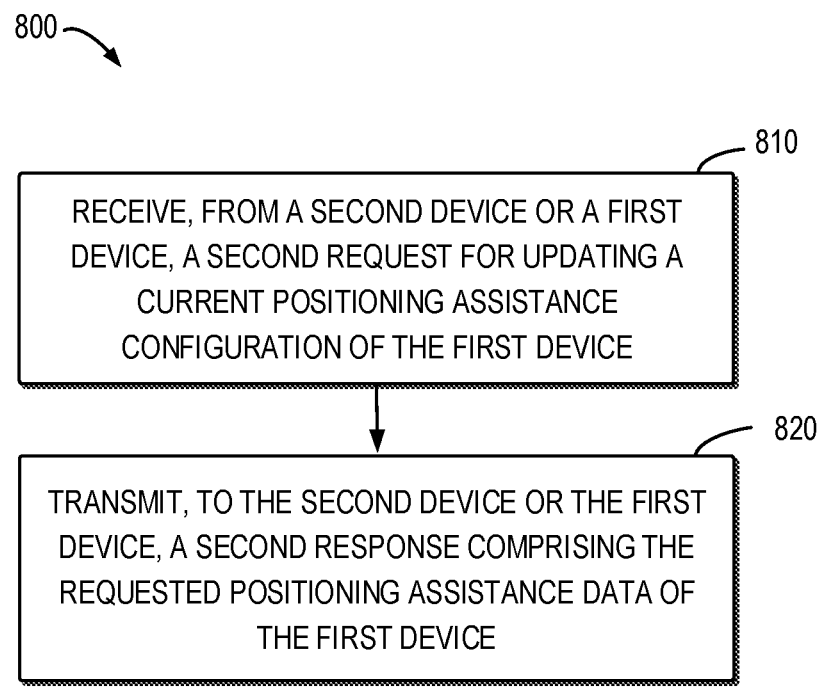
FIG. 8 illustrates an example flowchart of a method implemented at a third device according to some example embodiments of the present disclosure.

FIG. 8 shows a flowchart of an example method 800 implemented at a third device 130 in accordance with some example embodiments of the present disclosure. For the purpose of discussion, the method 800 will be described from the perspective of the third device 130 with respect to FIG. 1. It is to be understood that the method 800 may include additional blocks not shown and/or may omit some shown blocks, and the scope of the present disclosure is not limited in this regard.

At block 810, the third device 130 receives, from a second device 120 or a first device 110, a second request for updating a current positioning assistance configuration of the first device 110. The first device 110 is in a RRC inactive mode, and the current positioning assistance configuration is used by the first device 110 to receive a plurality of positioning reference signals from a plurality of positioning devices.

At block 820, the third device 130 transmits, to the second device 120 or the first device 110, a second response comprising the requested positioning assistance data of the current positioning assistance configuration.

In some example embodiments, the second request is a LPP message for updating positioning assistance configuration, and the second response is a LPP message with a data container comprising the requested positioning assistance data.

In some example embodiments, the first device 110 is a terminal device, the second device 120 is a network device, and the third device 130 is a location server.

Figure 9:
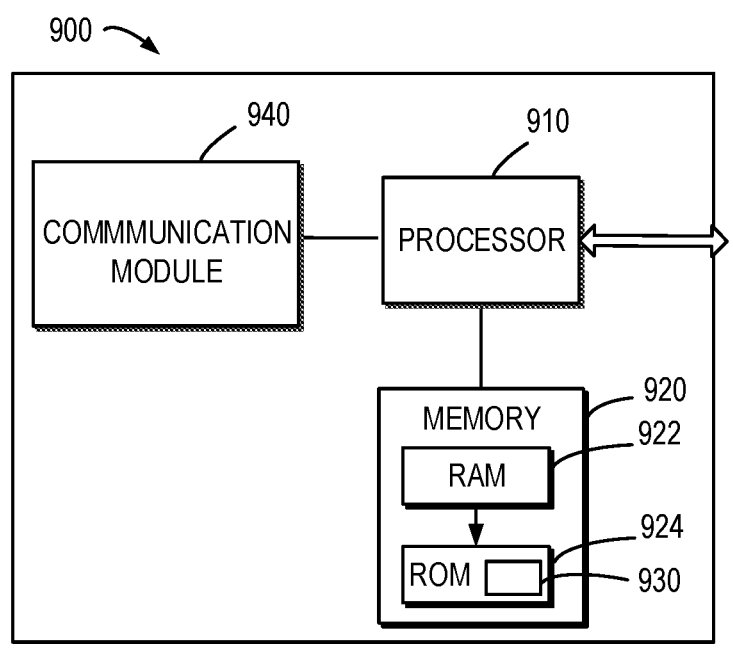
FIG. 9 illustrates a simplified block diagram of an apparatus that is suitable for implementing example embodiments of the present disclosure.
Figure 10:
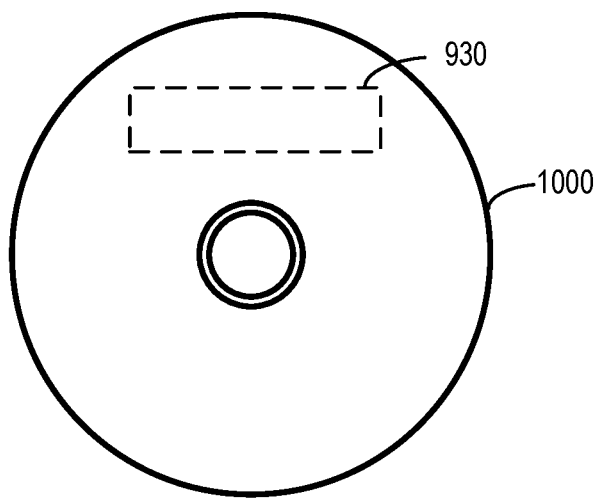
FIG. 10 illustrates a schematic diagram of an example computer readable medium in accordance with some example embodiments of the present disclosure.

FIG. 9 is a simplified block diagram of a device 900 that is suitable for implementing example embodiments of the present disclosure. The device 900 may be provided to implement the communication device, for example the first device 110, the second device 120 or the third device 130 as shown in FIG. 1. As shown, the device 900 includes one or more processors 910, one or more memories 940 coupled to the processor 910, and one or more transmitters and/or receivers (TX/RX) 940 coupled to the processor 910.

The TX/RX 940 is for bidirectional communications. The TX/RX 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 1020. The processor 910 may perform any suitable actions and processing by loading the program 930 into the RAM 920.

The example embodiments of the present disclosure may be implemented by means of the program 930 so that the device 900 may perform any process of the disclosure as discussed with reference to FIGS. 3 to 8. The example embodiments of the present disclosure may also be implemented by hardware or by a combination of software and hardware.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. shows an example of the computer readable medium 1000 in form of CD or DVD. The computer readable medium has the program 930 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 and method 800 as described above with reference to FIGS. 2-8. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
    at least one processor; and
    at least one memory including computer program code;
    wherein the at least one memory and the computer program code are configured to, with the at least one processor, cause the first device to:
    transmit, to a second device, a first request for updating a current positioning assistance configuration of the first device, the first device being in a radio resource control inactive mode, the first request is a long term evolution positioning protocol message for updating the current positioning assistance configuration, and the current positioning assistance configuration being used by the first device to receive a plurality of positioning reference signals from a plurality of positioning devices; and
    receive, from the second device, a first response comprising a requested positioning assistance data for updating the current positioning assistance configuration.

2. The first device of claim 1, wherein the at least one memory and the computer program code are configured to, with the at least one processor, cause the first device to transmit the first request by:
    determining whether at least one of the following conditions is met:
    a signal strength value of at least one of the plurality of positioning reference signals is below a threshold value,
    failure to receive at least one of the plurality of positioning reference signals,
    missing of a Quasi co-location information,
    outdating of an expected RSTD reference signal time difference; and
    detection of a further positioning device different from the plurality of positioning devices according to the current positioning assistance configuration of the first device; and
    in accordance with a determination that at least one of the conditions is met, transmitting the first request to the second device.

3. The first device of claim 2, wherein the first request comprises an indication that the at least one of the conditions is met.

4. The first device of claim 1,
    wherein the first device is served by the second device and is in the radio resource control inactive mode with respect to the second device; and
    wherein the first request is a Message 3 of a 4-step random access procedure and the first response is a Message 4 of the 4-step random access procedure.

5. The first device of claim 4, wherein the at least one memory and the computer program code are configured to, with the at least one processor, cause the first device to transmit the first request by:
    transmitting, to the second device, a Message 1 of the 4-step random access procedure transmitted with a pre-configured resource, the pre-configured resource indicating that the Message 3 of the 4-step random access procedure will be used as the first request for updating the current positioning assistance configuration;
    receiving, from the second device, a Message 2 of the 4-step random access procedure; and
    transmitting, to the second device, the Message 3 of the 4-step random-access procedure to update the current positioning assistance configuration of the first device.

6. The first device of claim 1,
    wherein the first device is served by the second device and is in the radio resource control inactive mode with respect to the second device; and
    wherein the first request is a Message A of a 2-step random access procedure and the first response is a Message B of the 2-step random access procedure.

7. The first device of claim 1, wherein the first device is served by the second device and a fourth device, and is in the radio resource control inactive mode with respect to the fourth device.

8. The first device of claim 1, wherein
    the first device is a terminal device, and
    the second device is a network device or a location server.

9. A second device comprising:
    at least one processor; and
    at least one memory including computer program code;
    wherein the at least one memory and the computer program code are configured to, with the at least one processor, cause the second device to:
    receive, from a first device, a first request for updating the current positioning assistance configuration of the first device, the first device being in a radio resource control inactive mode, the first request is a long term evolution positioning protocol message for updating the current positioning assistance configuration, and the current positioning assistance configuration being used by the first device to receive a plurality of positioning reference signals from a plurality of positioning devices; and transmit, to the first device, a first response comprising a requested positioning assistance data for updating the current positioning assistance configuration.

10. The second device of claim 9, wherein the first request comprises an indication that the at least one of followings conditions is met:
   a signal strength value of at least one of the plurality of positioning reference signals is below a threshold value,
   failure to receive at least one of the plurality of positioning reference signals,
   missing of a Quasi co-location information,
   outdating of an expected RSTD reference signal time difference and
   detection of a further positioning device different from the plurality of positioning devices according to the current positioning assistance configuration of the first device.

11. The second device of claim 9,
   wherein the first device is served by the second device and is in the radio resource control inactive mode with respect to the second device; and
   wherein the first request is a Message 3 of a 4-step random access procedure and the first response is a Message 4 of the 4-step random access procedure.

12. The second device of claim 11, wherein the at least one memory and the computer program code are configured to, with the at least one processor, cause the second device to receive the first request by:
   receiving, from the first device, a Message 1 of the 4-step random access procedure transmitted with a pre-configured resource, the pre-configured resource indicating that the Message 3 of the 4-step random access procedure will be used as the first request for updating the positioning assistance configuration;
   transmitting, to the first device, a Message 2 of the 4-step random access procedure from the second device; and
   receiving, from the first device, the Message 3 of the 4-step random-access procedure for updating the current positioning assistance configuration of the first device.

13. The second device of claim 9,
   wherein the first device is served by the second device and is in the radio resource control inactive mode with respect to the second device; and
   wherein the first request is a Message A of a 2-step random access procedure and the first response is a Message B of the 2-step random access procedure.

14. The second device of claim 9, wherein the first device is served by the second device and a fourth device, and is in the radio resource control inactive mode with respect to the fourth device.

15. The second device of claim 9, wherein the at least one memory and the computer program code are configured to, with the at least one processor, cause the second device to transmit the first response by:
   transmitting, to a third device, a second request for updating the current positioning assistance configuration of the first device according to the first request; and
   in accordance with a determination of receiving a second response comprising the requested positioning assistance data from the third device, transmitting, to the first device, the first response based on the received second response.

16. The second device of claim 9, wherein
   the first device is a terminal device, and
   the second device is a network device or a location server.

17. A method, comprising:
   transmitting, at a first device and to a second device, a first request for updating a current positioning assistance configuration of the first device, the first device being in a radio resource control inactive mode, the first request is a long term evolution positioning protocol message for updating the current positioning assistance configuration, and the current positioning assistance configuration being used by the first device to receive a plurality of positioning reference signals from a plurality of positioning devices; and
   receiving, from the second device, a first response comprising a requested positioning assistance data for updating the current positioning assistance configuration.

18. A non-transitory computer readable medium comprising program instructions for causing an apparatus to perform at least the method of claim 17.

\* \* \* \* \*